Sept. 18, 1962
C. B. BAKER
3,054,363
SYSTEM FOR SECURING A FREIGHT VEHICLE
TO A TRANSPORTING VEHICLE
Filed Feb. 27, 1959
5 Sheets-Sheet 2
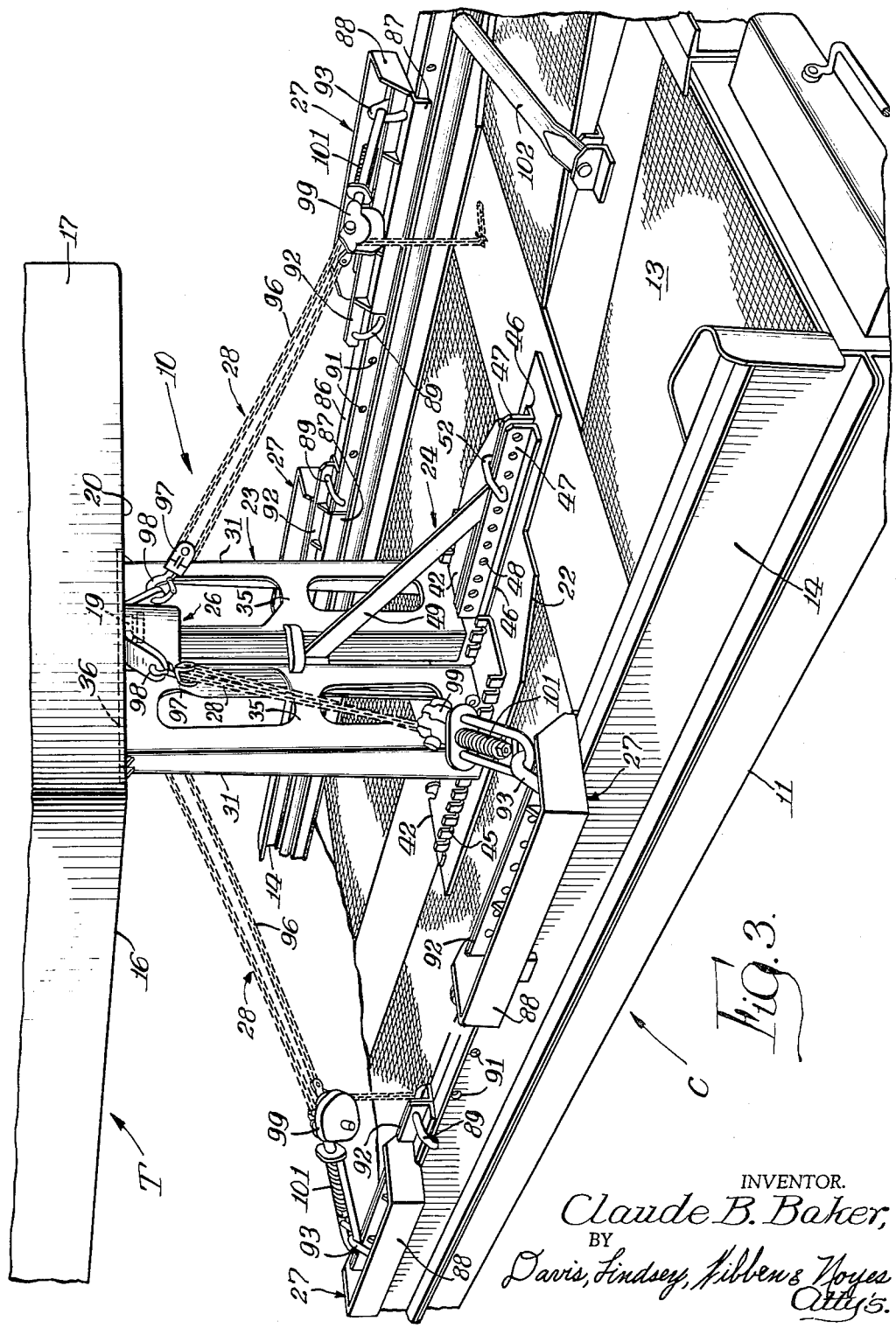
INVENTOR.
Claude B. Baker,
BY
Davis, Lindsey, Hibben & Noyes
Attys.

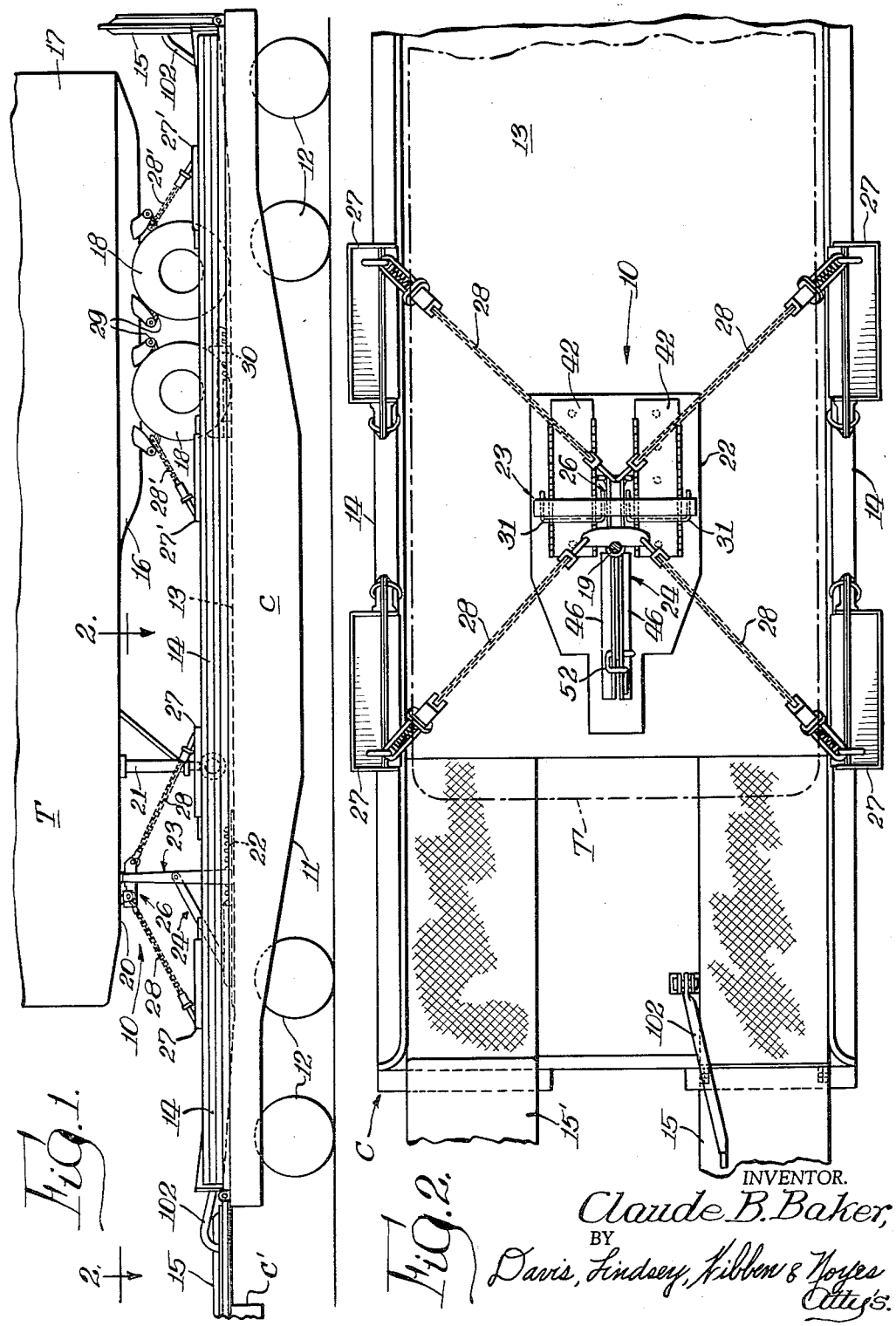

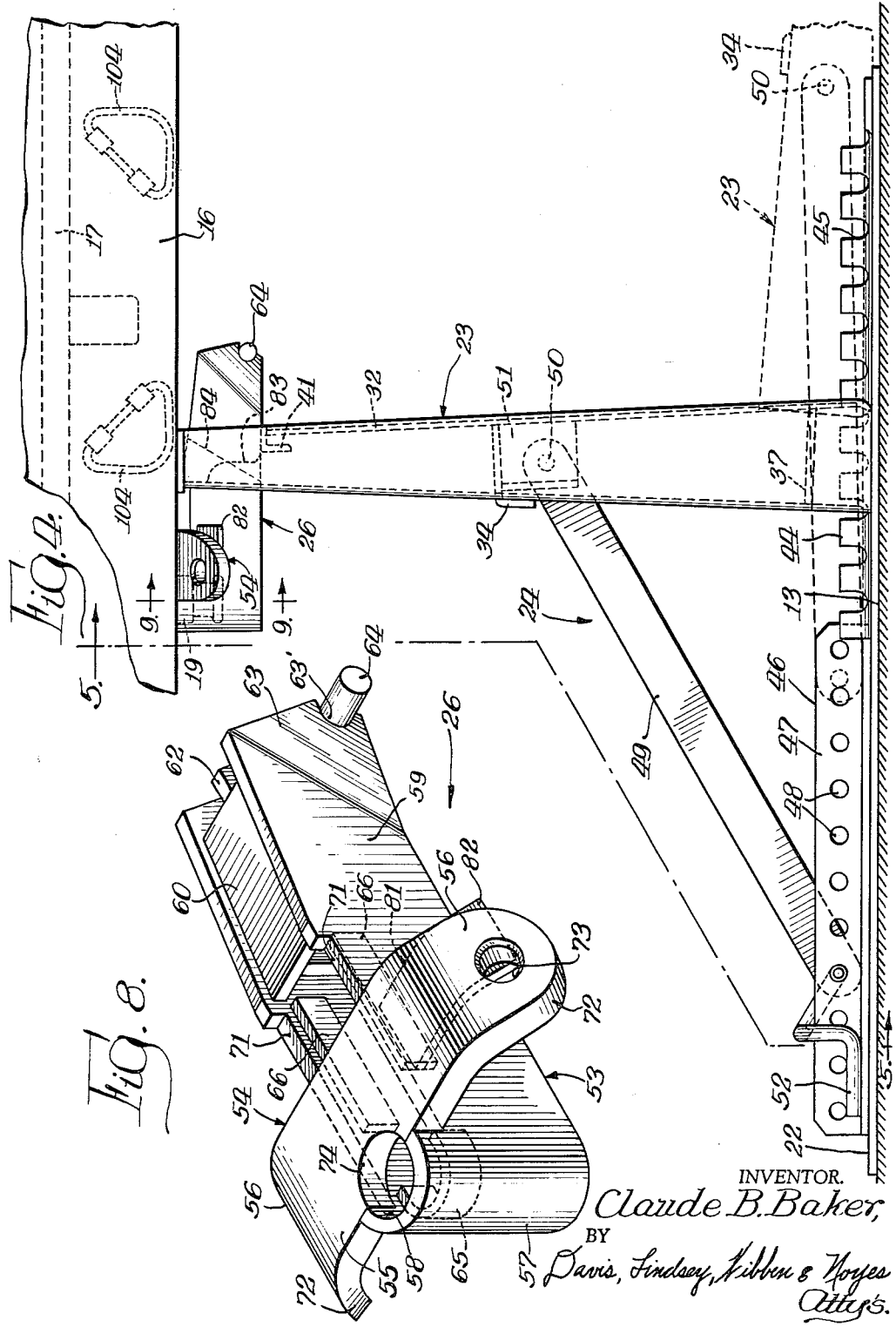

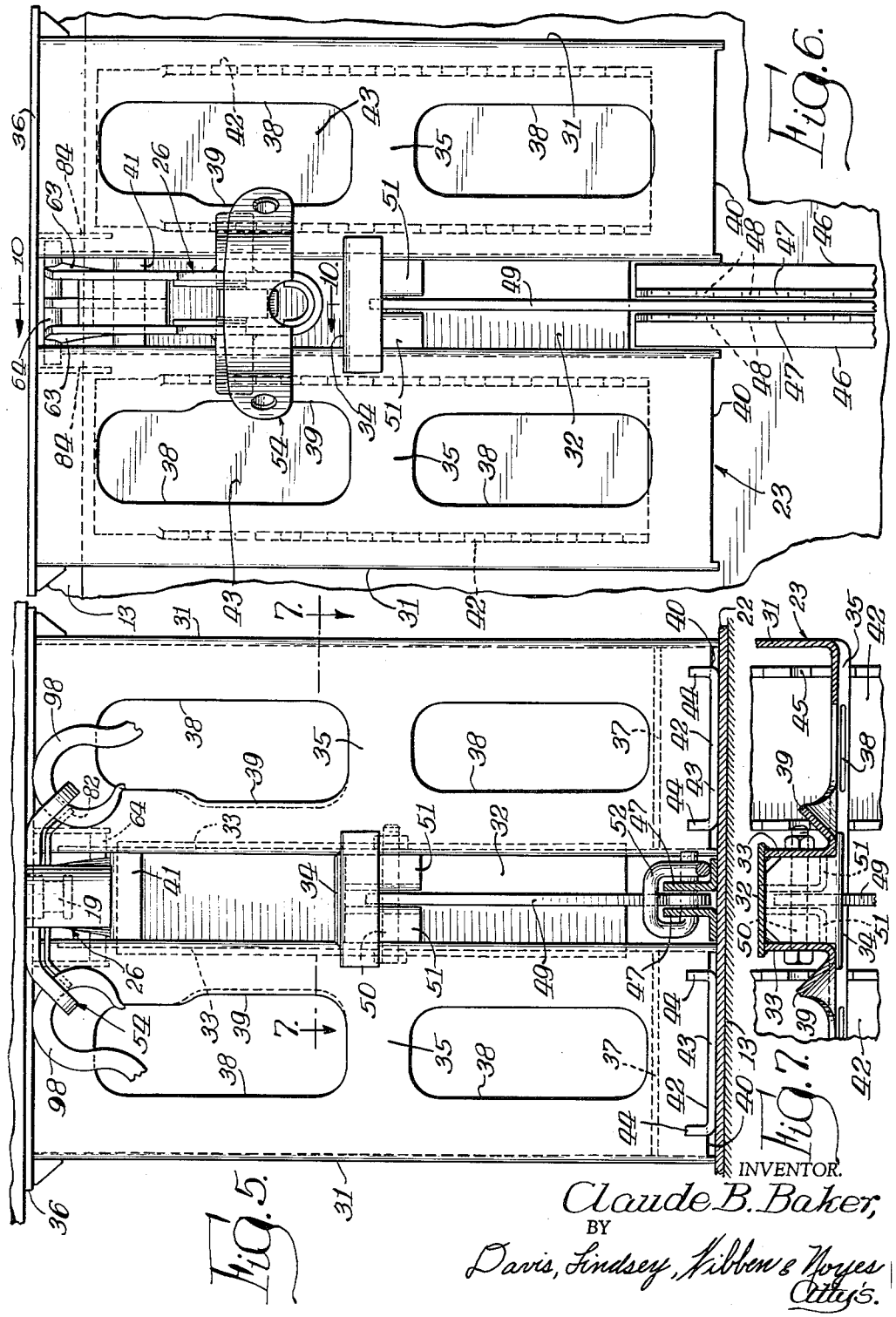

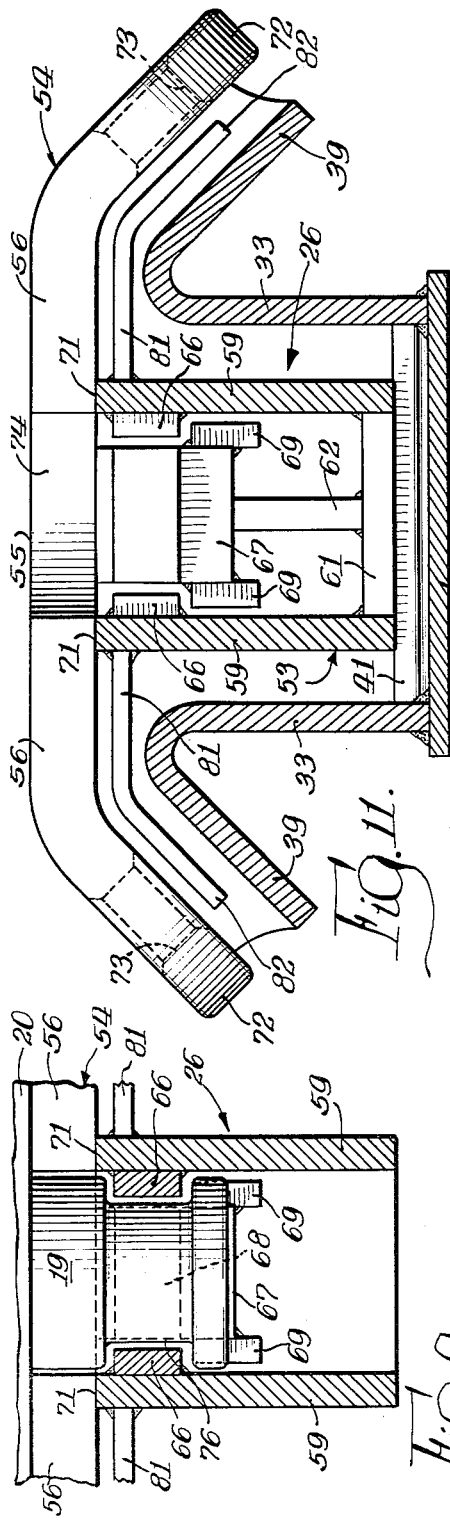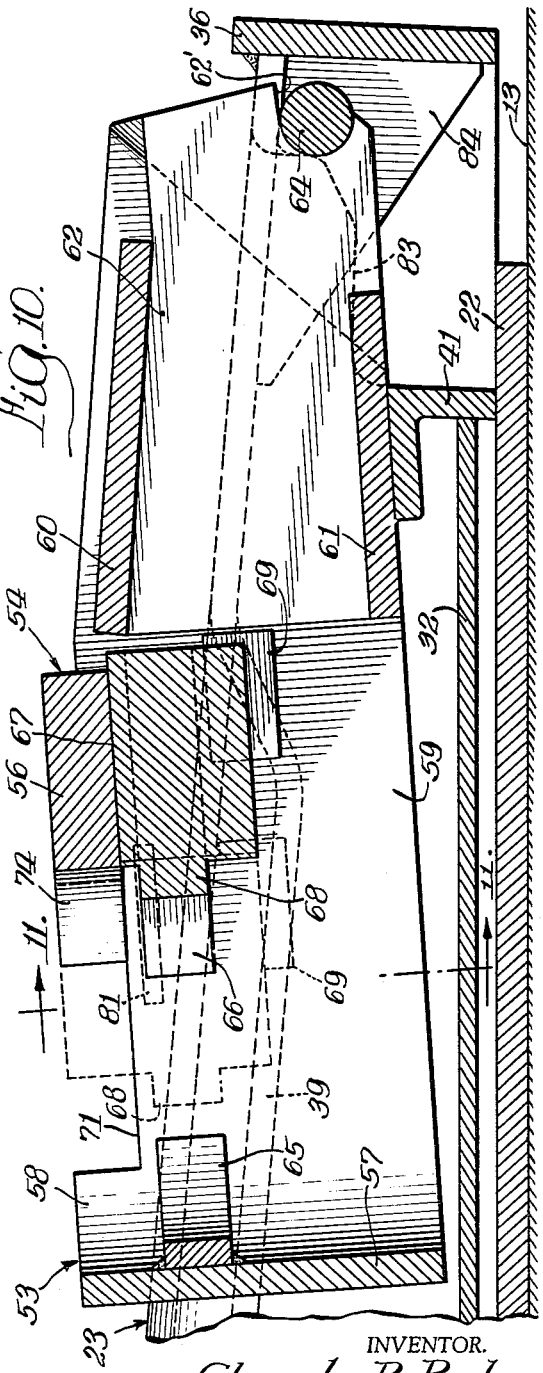

United States Patent Office 3,054,363
Patented Sept. 18, 1962

3,054,363
SYSTEM FOR SECURING A FREIGHT VEHICLE
TO A TRANSPORTING VEHICLE
Claude B. Baker, Chicago, Ill., assignor to Illinois Central
Railroad Company, Chicago, Ill., a corporation of Illinois
Filed Feb. 27, 1959, Ser. No. 796,024
8 Claims. (Cl. 105—368)

This invention relates to a novel system for securing a freight vehicle to a transporting vehicle for transit therewith and more particularly to a novel support and hold-down means for one end of a freight vehicle body.

As a result of the increased use and advantages of the so-called piggyback transportation system, particularly as applied to the combination of a highway freight vehicle and a railroad transporting vehicle, a need has arisen for an improved system for securing the freight vehicle to the transporting vehicle which provides for a rapid loading and unloading of the freight vehicle and a positive cushioned securement of the freight vehicle during transit. In addition, such a system must be of a simple construction, easy to operate, and economical to manufacture and install if substantial savings are to be realized by the shipper and operator of the transporting vehicle.

Various devices have been developed heretofore for use in transportation systems of the aforesaid type, but each of these has proven deficient either because of their complexity of construction and operation, time required to load and unload the freight carrying vehicle, and marginal reliability in use, or because of their high cost of installation and maintenance. Moreover, some of the systems heretofore suggested require elaborate additional equipment and various preliminary operations before the freight vehicle, such as a highway trailer, can be loaded or unloaded from the transporting vehicle, such as a railroad car.

The present invention overcomes the foregoing deficiencies by providing an improved securement system for use in a piggy-back type transportation system that is particularly adapted for use in securing the freight carrying trailer of a highway tractor-trailer vehicle to a railroad car.

Accordingly, it is a general object of the present invention to provide an improved system for securing a freight vehicle to a transporting vehicle.

A specific object of the invention is to provide an improved system for securing the trailer of a tractor-trailer highway vehicle to a railroad car.

Another object of the invention is to provide an improved system for securing a freight vehicle to a transporting vehicle in which the loads from the freight vehicle are transmitted to and distributed throughout the transporting vehicle in an improved manner.

Still another object of the invention is to provide an improved collapsible fifth wheel stand for securing a highway trailer to a railroad transporting vehicle in which the trailer and its associated tractor may be driven over the stand when the latter is in a collapsed inoperative position without contacting the trailer or tractor undercarriage.

A further object of the invention is to provide an improved device for securing a freight vehicle having a king pin to a railroad transporting vehicle in which the device coacts with the king pin of the trailer to provide an improved cushioned securement of the trailer to the railroad vehicle.

Another object of the invention is to provide an improved system for securing a freight vehicle, such as a highway trailer, to a transporting vehicle, such as a railroad car, which requires a minimum of supplemental equipment and tools to effect a loading or unloading of the trailer from the car.

A further object of the invention is to provide an improved system for securing a freight vehicle to a transporting vehicle which is simple in construction and operation, reliable in use, and economical in cost and operation.

Many other objects and advantages of the invention will become apparent upon making reference to the detailed description which follows and accompanying drawings, in which:

FIG. 1 is a somewhat diagrammatic side elevational view of a railroad car equipped with the securement system of the invention and showing the system in operation securing a highway trailer type freight vehicle to the car;

FIG. 2 is a somewhat enlarged fragmentary top plan view of the securement system of the invention, taken along the line 2—2 of FIG. 1;

FIG. 3 is an enlarged fragmentary perspective view of the securement system of the invention with the parts thereof in an operative position;

FIG. 4 is a fragmentary side elevational view, on an enlarged scale of the securement means seen in FIG. 3, an inoperative position of the device being shown in dotted lines;

FIG. 5 is a front elevational view taken substantially along the line 5—5 of FIG. 4;

FIG. 6 is a top plan view showing the securement device in an inoperative collapsed position;

FIG. 7 is a fragmentary transverse sectional view along the line 7—7 of FIG. 5;

FIG. 8 is an enlarged perspective view of a novel portion of the invention;

FIG. 9 is an enlarged fragmentary sectional view along the line 9—9 of FIG. 4;

FIG. 10 is an enlarged longitudinal sectional view along the line 10—10 of FIG. 6; and FIG. 11 is a vertical sectional view along the line 11—11 of FIG. 10.

Briefly described, the present invention contemplates an improved system for securing a freight vehicle, such as a highway trailer, to a transporting vehicle, such as a railroad flat car, so that the trailer and its cargo can be rapidly loaded and transported safely on the railroad car to a rail terminal at which point the trailer is coupled to a tractor unit and driven as a highway vehicle to an ultimate off-terminal destination.

According to the present invention, a collapsible stand or support is provided on the railroad car for supporting the front end of the trailer at the fifth wheel plate thereof adjacent the trailer king pin. The stand is collapsible between an upright operative position and a prone inoperative position on the deck of the flat car and is also adjustable throughout a range of fore and aft positions on the car to accommodate various sizes of trailers. When in an upright position, the stand is rigidly secured to the car deck. The stand also includes a novel coupling or hold-down device for releasably engaging the king pin of the trailer. The coupling is connected to the car by a plurality of annularly disposed cushioned tie-downs which coact with the coupling to maintain the latter engaged with the king pin and to distribute the applied loads from the trailer to a plurality of adjustable anchors carried on tracks at the sides of the car. When operatively secured to the king pin of the trailer, the coupling becomes in effect a part of the trailer and is movable therewith substantially independently of the stand so that the stand is substantially free from loads caused by a longitudinal or lateral shifting of the trailer during transit.

The aforesaid adjustable anchors carried by the transporting vehicle form the subject of my copending application for patent, Serial Number 795,862, filed February 26, 1959, now U.S. Patent No. 2,970,552.

Referring now to FIGS. 1 and 2 of the drawings, a transporting vehicle such as a railroad flat car C is illustrated, which is equipped with a securement system constructed according to the present invention and indicated generally at 10, the latter comprising one specific embodiment thereof. A highway trailer freight vehicle T is positioned on the car C and is secured thereto for transit therewith by the system 10, to be described hereinafter.

The flat car C is conventional to the extent that it includes a frame 11 having trucks 12 mounted at each end thereof and a deck 13 mounted on the frame 11. A pair of longitudinally extending anchor rails 14 defining tracks along the sides of the car C are mounted on the frame 11, and a pair of pivotally mounted ramps or aprons 15 are mounted at the ends of the car at diagonally opposite corners. The aprons 15 provide means for bridging the space between an adjacent car C′, or a loading dock, to permit a trailer such as the trailer T and its associated tractor unit to be driven onto the car C for loading and unloading. The purpose and function of the anchor rails 14 will be described in more detail hereinafter.

The freight vehicle T is in this instance a highway trailer of the fifth wheel type that is adapted to be coupled to a motor driven-tractor unit for transit over the highways. The trailer T thus comprises an underframe 16 on which is mounted a trailer body 17 that is supported at its rear end by spring cushioned wheels 18 and at its front end by a fifth wheel which includes a king pin 19 (FIG. 2) and a fifth wheel plate 20. A pair of retractable landing wheels 21 are provided to support the front end of the trailer body 17 when the latter is not coupled to a tractor unit, as is conventional.

Referring now to FIG. 3 in conjunction with FIGURES 1 and 2, it will be seen that the securement system 10 of the invention generally comprises a base plate 22 secured to the car deck 13 adjacent an end thereof, a collapsible stand or support 23 mounted on the base plate 22 for supporting the front end of the trailer at its fifth wheel plate 20, brace means 24 carried by the plate 22 for adjusting the position of the stand 23 on the plate and for rigidifying the same when in an operative position, a coupling 26 carried by the support 23 for engagement with the trailer king pin 19, a plurality of slidably mounted anchors 27 carried on the rails 14, and a plurality of cushioned tie-downs 28 which interconnect the coupling 26 and anchors 27 when the system 10 is in use.

The rear end of the trailer body 17 is secured to the car C by two angularly disposed cushioned tie-downs 28′ (FIG. 1) connected to the trailer chassis at each side thereof, such as around its springs 29, the ends of the tie-downs 28′ being connected to a pair of longitudinally spaced anchors 27′ disposed on either side of the trailer wheels 18 in a manner similar to the arrangement and positioning of the tie-downs 28 and anchors 27 at the front of the trailer. A chock 30 is secured to at least one of the wheels 18 on each side of the trailer to provide additional restraint to fore and aft movements thereof during acceleration loads.

As will be apparent from FIG. 1, the base plate 22 is secured to the car deck 13 in a position generally underlying the king pin 19 and the fifth wheel plate 20 of the trailer when the latter is positioned on the car C. As best seen in FIG. 2 the plate 22 is shaped to accommodate the full range of positions of the stand 23 thereon and to mount the brace means 24. The plate 22 is effective to prevent stress concentrations from the stand 23 and the brace means 24 when a trailer is mounted thereon.

Referring now to FIGS. 4–7, in conjunction with FIGS. 2 and 3, it will be seen that the stand 23 in this instance is a shallow generally rectangular frame formed from a pair of longitudinally arranged transversely spaced channel sections 31 disposed in side-by-side relation and joined together by connecting structure into a rigid unitary assembly. Such connecting structure comprises in this case an elongated rectangular plate 32 (FIGS. 5, 6, and 7) that is welded to the channels 31 along their adjacent inner flanges 33, a centrally disposed flanged plate 34 (FIG. 4) having its plate portion disposed transversely between and connected to the inner flanges 33 with its flanged portion overlapping the web portions 35 of the channels 31, and an elongated rectangular top or platform plate 36 which spans the channels 31 across their end edges and provides a platform for engaging the plate 20 of the trailer T. The stand 23 is further rigidified by a pair of shelves or plates 37 (FIG. 5) disposed between the channel flanges at the lower end of each channel 31. The webs 35 of each channel section 33 are cut out, as at 38, for weight reduction and to facilitate access to the coupling 26, the upper cutouts 38 having their inner longitudinal edges bent inwardly as at 39 (FIG. 7) for a purpose to be described more fully hereinafter. The flanges 33 of the channels 31 may be tapered from their lower ends toward the upper end of the stand for additional weight saving, as best seen in FIGS. 3 and 4.

The supporting plate 32 is somewhat shorter than the channels 31 and thus terminates at a point somewhat above the deck of the car and below the platform plate 36. An angle section 41 (FIGS. 4 and 5) is secured at the upper end of the plate 32 spanning the inner flanges 33. The angle section 41 provides a supporting surface for the coupling 26 when the latter is in a horizontal operative position, as hereinafter described.

All joints in the stand 23 and generally throughout the remainder of the securement system 10 are preferably made by welding, though other fastening techniques could also be employed.

The positioning means for the stand 23 comprises, in this instance, a pair of longitudinally arranged channels 42 secured in transversely spaced relation on the plate 22 so as to underlie the fifth wheel plate 20 of the trailer. The channels 42 are secured to the plate 22 along their web portions 43 with their flanges 44 extending upwardly. The flanges 44 have a toothed or serrated configuration including a series of spaced cutouts or notches 45 (FIG. 4) for receiving the lower end edges of the web portions 35 of the stand 23 (FIGS. 4 and 5). In order to insure that the lower end edges of the flanges of the channels 31 seat against the plate 22 at each side of the notched channels 42, the lower ends of the web portions 35 are recessed, as at 40 (FIGS. 5 and 6) to a width and depth at least equal to that of the webs 43 of the channels 42. An ample number of notches 45 are formed in the flanges 44 to accommodate the various types and sizes of trailers and fifth wheel constructions in service.

The brace means 24 for the stand 23 comprises, in this instance, a pair of elongated transversely spaced angle bars 46 (FIG. 3) centrally mounted on the plate 22 and forwardly of the notched channels 42. The angle bars 46 are each mounted with one flange 47 thereof disposed upwardly in closely spaced relation to the other to define a slot or track therebetween. A series of transversely aligned apertures 48 are spaced along the flanges 47, the spacing preferably being substantially equal to that of the notches 45. A diagonal brace or strut 49 is pivotally secured at one end to the central portion of the stand 23 by a bolt 50 (FIGS. 5 and 7) extending through the inner flanges 33 below the flanged plate 34. A pair of reinforcing angle elements 51 (FIGS. 4–6) are also provided between the flanges 33 for supporting the bolt 50 and receiving the pivoted end of the brace 49 therebetween. The other end of the brace 49 is provided with an aperture such that a locking pin 52 may be inserted through a pair of apertures 48 in the flanges 47 and through the aperture in the end of the brace 49 to secure the latter in an adjusted position and thus rigidify the stand 23 against fore and aft movement when in an operative trailer-supporting position.

Thus, the notched channels 42 and the pinned connection of the brace 49 coact to permit the stand 23 to be rigidly secured on its base plate 22 in a plurality of operative positions to accommodate various sized trailers. In addition, the foregoing construction also permits the stand 23 to be rapidly secured in position and to be knocked down by the tractor unit to an inoperative prone position on the car deck, as indicated in FIG. 6 and in dotted lines in FIG. 4, when the trailer T is to be unloaded. As will be evident from FIG. 4, the teeth of the notched channel flanges 44 are spaced sufficiently by the cutouts or notches 45 to allow the recessed lower ends 40 of the channel web portions 35 to freely disengage from the teeth during knockdown movement of the stand 23 from its upright position (shown in full lines in FIG. 4) to its inoperative prone position (shown in dotted lines in FIG. 4). Moreover, as seen in FIG. 6, the inner and outer flanges of the channels 31 are spaced outwardly of the respective notched flanges 44 whereby to permit fore and aft adjustment of the stand 23 when the latter is in its inoperative prone position.

Referring now to FIGS. 8–11 in conjunction with FIGS. 4–7, it will be seen that the coupling or king pin securement 26 is movably disposed at the upper end of the stand 23 in the opening between the top plate 36 and the angle section 41 so that the coupling 26 is capable of shifting fore and aft to a limited extent with the trailer in relation to the stand 23 when the coupling is secured to the king pin 19. The coupling 26 consists of two relatively movable parts, namely, a yoke portion 53 and a winged latch portion 54 that includes a plate portion 55 having transversely extending wings 56 for locking the coupling 26 to the king pin 19.

The yoke portion 53 is preferably formed from plate stock that is bent into an elongated U-shape such that the loop or bight portion 57 thereof has a curved inner surface 58 adapted to conform closely to the outer curvature of the king pin 19. The spaced side plate portions of the yoke 53, indicated at 59, are maintained in spaced relation and rigidified by a pair of generally horizontally disposed upper and lower cross plates 60 and 61, respectively. A centrally disposed upright plate 62 (FIGS. 8 and 10) is secured parallel to the sides 59 and perpendicular to the plates 60 and 61 to further strengthen and rigidify the coupling 26 and has a recess 62' at its outer end. The remote ends 63 of the sides 59 are flared or bent outwardly along a diagonal bend line, as seen in FIGS. 6 and 8, and are formed with recesses 63' aligned with the recess 62'. A cylindrical cross bar 64 is rigidly fastened in the recess 62'–63' and provides an attachment point for the cushioned tie-downs 28. The flared ends 63 prevent binding of the tie-down connecting structure with the sides 59 when the system is in operation. The yoke 53 also includes a U-shaped ledge element 65 rigidly affixed to the inner surface 58 of the loop 57 for engagement in the groove, indicated at 76, of the king pin 19 (FIG. 9), and a pair of elongated retaining bars 66 are secured to the inner walls of the yoke sides 59 to entrain the winged latch portion 54, as will hereinafter be described.

The latch portion 54 comprises the plate portion 55 and transversely extending wings 56 and a centrally disposed guide block 67 rigidly affixed to the underside of the plate 55 between retaining bars 66 such that movements of the latch 54 are guided thereby. The guide block 67 includes a forwardly extending abutment or key portion 68 (FIG. 10) for engagement with the groove 76 in the king pin. The abutment 68 thus cooperates with the ledge element 65 to lock the coupling 26 to the king pin when the latch is moved forwardly. A pair of abutments 69 are secured to the sides of the guide block 67 immediately below the retaining bars 66 to permanently entrain the latch 54 in the yoke 53. The wings 56 extend beyond the sides of the yoke and the central plate portion 55 is slidably disposed in elongated notches or recesses 71 formed in the upper edges of the yoke sides 59 so that the upper surface of the plate portion 55 is flush with the upper edges of the yoke. The outer ends of the wings 56 are bent downwardly, as at 72, substantially at a 45° angle to the horizontal and are provided with holes 73 to facilitate attachment of the adjustable tie-downs 28 (FIGS. 3 and 5). The front edge of the plate portion 55 is provided with a semicircular notch 74 (FIG. 8) which complements the loop portion 57 of the yoke so that when the latch 54 has been moved fully forward, the shank of the king pin 19 will be circumferentially engaged at 58 and 74.

In order to prevent the coupling 26 from becoming disengaged from the king pin 19 before the tie-downs 28 have been tensioned, a pair of locking bars or ears 81 (FIGS. 8 and 11) are secured to the outer walls of the sides 59 below the ends of the wings 56 and are disposed so as to have the forward edges thereof approximately tangent to the projected holes 73 when the latch 54 is in its forward king pin interlocking position (FIGS. 6 and 8). Thus, when the attaching hooks of the tie-downs 28 are inserted through the holes 73 after the coupling 26 has been engaged around the king pin 19, the latch 54 cannot be moved rearwardly in the yoke. The outer ends of the ears 81 are also bent downwardly, as at 82 (FIG. 11), to conform with the bent portions 72 of the wings 56.

When initially assembling the device, the coupling 26 is mounted in the stand 23 without the crossbar 64 which is thereafter positioned in the notches 62'–63' and welded to the members 62 and 63. The bar 64 is sufficiently long to engage the inner flanges 33 of the channels 31 so that the coupling 26 becomes permanently though movably attached to the stand 23.

In order to permit the coupling 26 to nest between the channels 31 of the stand 23 when the latter has been collapsed into a prone position on the car deck for loading or unloading, the inner flanges 33 of the channels 31 are cut back, as at 83 (FIGS. 4 and 10) adjacent the platform plate 36 so that the coupling 26 can be moved forwardly and downwardly in the stand 23 to the nested position illustrated in FIGS. 6 and 10. When nested with the stand 23, the plate 61 of the coupling 26 is supported on the angle section 41 (FIG. 10) with the yoke portion 53 being received in the pocket defined between the flanges 33 and the plates 32, 34, and 36. The latch portion 54 of the coupling fits snugly across the stand, the curved edges 39 of the flanges 33 accommodating the downturned ends 82 and 72 as seen in FIG. 11, and the ends of the crossbar 64 being received in the recesses formed by the cut-outs 83 below the plate 36. The angle section 41 also supports the coupling 26 along its lower surface when the coupling is in a horizontal position prior to tensioning of the tie-downs 28, as seen in FIG. 4. A pair of gusset plates 84 (FIGS. 6 and 10) are also secured between the plate 36 and the webs 35 to strengthen the stand and for enclosing the ends of the bar 64 when the coupling 26 is in a nested inoperative position.

When the coupling 26 is in a nested position between the channels 31 of the stand 23 and the latter is in a prone position on the car deck, the overall height of the assembly is less than eight inches thereby providing clearance for the undercarriage of the trailer T and its associated tractor unit.

Referring again to FIGS. 1–3, the adjustable anchors 27, are carried on the side rails 14 of the car in sliding engagement therewith, the rails 14 preferably being I-beams having horizontal flange portions 86 which interlock with the frame structures 87 of the anchors 27 to prevent disengagement. Each frame section 87 includes an elongated rectangular box or tray portion 88 which extends outwardly of the rail 14 to provide a convenient storage compartment for the cushioned tie-downs 28 when the latter are not in use. The trays 88 also provide a stand for loaders or freight handlers during loading and unloading of the car C.

Means are also included for securing each anchor 27 in an adjusted position on the rail 14, said means in this instance comprising a C-shaped locking ring 89 carried by the frame structure 87 and adapted to be jointly inserted through an aperture therein (not shown) and a selected one of a plurality of longitudinally spaced apertures 91 in the rail 14 below the flange section 86 thereof. The rings 89 are rotatable when in a vertical position so as to bring the gap therein into registry with the web of the track 14 thereby permitting the anchors 27 to be moved along the rail. When a ring 89 is engaged through an aperture 91 in the track 14 with the gap disposed upwardly, the ring may swing to an inclined position with its ends straddling an upstanding longitudinal flange 92 carried by the frame 87. Thus, the ring 89 is prevented from rotation. Each anchor also includes a loop 93 secured to the frame section 87 to provide a connection point for one end of a tie-down 28.

Each tie-down 28 preferably comprises a length of chain 96 having a block or pulley 97 and a hook 98 at one end thereof for connection to the coupling 26, a tensioning mechanism 99 in the form of a hoist carried at the anchor engaging end thereof, and cushioning means in the form of a spring 101 interposed between the hoist 99 and the attaching loop 93. The hoists 99 function to shorten the chains 96 in a conventional manner, and the spring cushions 101 provide resilience to the tie-downs within the load ratings of the springs. In practice, it is desirable to preload the tie-downs 28 to a tension of approximately two thousand pounds which may be varied with the load.

The operation of the securement system of the present invention is as follows. Assuming that the stand 23 is in an inoperative prone position on the car deck and the tie-downs 28 are disposed in the trays 88, the aprons at the ends of the car C are lowered to a horizontal bridging position between the car C and an adjacent car C' by unlatching a retaining bar 102 and allowing the aprons to pivot downwardly to a horizontal position. The foregoing operation may be facilitated by a torsion spring disposed about the pivot axis of each apron. A corresponding apron is also lowered to its horizontal operating position on the adjacent car C' in order to provide a bridge on both sides of the car C.

The tractor unit (not shown) includes mechanism for raising the front end of the trailer T a few inches higher than its normal coupled fifth wheel position. The front end of the trailer must be elevated during loading and unloading to permit the landing wheels 21 of the trailer to clear the car deck. The trailer is backed or driven onto the car C and generally positioned so that its king pin 19 is above the notched channels 42 on the base plate 22. The rear wheels 18 of the trailer are then chocked and the landing wheels 21 lowered as a safety measure. The stand or support 23 is thereafter raised from its horizontal position on the car deck to an erect position underlying the fifth wheel plate 20 of the trailer and at a point six to ten inches behind the king pin 19. The diagonal brace 49 is then pinned to the angle bars 46 and the front end of the trailer is lowered onto the stand 23, the landing wheels 21 being adjusted to a position somewhat above the car deck.

After the trailer is supported on the stand 23 the coupling or king pin securement 26 is pivoted upwardly so that king pin 19 is seated in the loop 57 of the yoke 53 and the winged latch 54 is then brought forward into locking engagement therewith. The hooks 93 are then inserted through the openings 73 of the wings 56 to maintain the coupling 26 secured to the king pin 19. The forward anchors 27 are then adjusted on the rails 14 to positions forwardly of the stand 23 and the front tie-downs 28 are initially tensioned. The rear pair of anchors are then adjusted on the rails 14 and the hooks 98 of the rear pair of tie-downs are then engaged over the bar 64 in the slots between the central plate 62 and the flared ends 63 of the side plates 59.

It should be noted that each forward and rearward pair of anchors 27 are adjusted on the tracks 14 for a particular position of the stand 23 so as to be symmetrically and equidistantly spaced from the stand 23 and such that the adjustable tie-downs 28 are disposed approximately at a 45° angle to the deck of the car in both horizontal and vertical planes (FIGS. 2 and 3) when connected to the anchors 27. With the tie-downs 28 disposed at a 45° angle, an advantageous force distribution is obtained regardless of the direction of the applied load. With the yoke and latch portions thus secured to the king pin 19 it will be seen that the entire coupling 26 is effectively a part of the trailer T and slight movements thereof are accommodated by the movable relationship between the coupling 26 and the stand 23 thereby protecting the latter from dynamic loads.

After both pairs of front tie-downs 28 have been adjusted and preloaded, a similar procedure is followed as to the rear tie-downs 28' and anchors 27' by threading chain slings (not shown) over the trailer springs or around the trailer axles and connecting the hooks of the tie-downs 28' to the slings. The rear anchors 27' are adjusted on the rails 14 so that the tie-downs 28' also have a 45° angular relationship to the car deck and center line. The final operation is to raise the bridging aprons at each end of the car and secure them in an upright position by means of safety latches.

Unloading of the trailer from the railroad car is substantially the reverse of the loading procedure. The tie-downs are released, the coupling 26 is lowered into its pocket, and the brace 49 disconnected. Thereafter, the tractor strikes the stand knocking it over to a collapsed position and the tractor then couples with the trailer.

The securement system 10 is also readily adapted for use with trailers having D-rings 104 (FIG. 4), the only difference being that the coupling 26 is not used and the tie-downs 28 are secured to the D-rings.

It will be apparent from the foregoing that the present invention provides an improved system for securing a freight vehicle, such as a highway trailer, to a transporting vehicle, such as a railroad car, so that the former can be rapidly and safely secured to the transporting vehicle for transit therewith. Moreover, the securement system of the present invention utilizes easily constructed components, which may be fabricated from conventional materials, and is thus economical in cost. In addition, because of the simplicity of construction and arrangement of the parts thereof, the system is readily adapted for use in diverse applications such as for securing freight or articles of lading to ships, barges, airplanes, and other transporting vehicles.

While only one embodiment of the invention has been herein illustrated and described, it will be understood that variations and modifications thereof may be effected without departing from the scope of the concepts thereof as set forth in the appended claims.

I claim:

1. In a system for securing a freight vehicle having a depending king pin to a transporting vehicle having a stand mountable in upright position with a platform portion at its upper end for supporting a portion of the freight vehicle adjacent the king pin, the improvement which comprises means on the stand defining a transverse opening therethrough below the platform, a coupling movably carried by the stand and extending through said opening, said coupling comprising a pair of relatively movable members adapted to be clamped around the king pin, first tie-down means connectible to the transporting vehicle and to one of said members for urging said one member in one direction, and second tie-down means connectible to the transporting vehicle and to the other of said members for urging said other member in the opposite direction toward said one member whereby to hold said members in clamped relation around the king pin and to restrain the freight vehicle against movement, said coupling being shiftable fore and aft through said opening to a limited extent relative to the stand whereby to protect the stand against imposition of dynamic loads from the freight vehicle.

2. The structure of claim 1 further characterized in that said one coupling member comprises an elongated yoke member having at one end thereof a loop portion adapted to be disposed at one side of the king pin and said other coupling member comprises a transversely extending latch member slidably connected to said yoke member and adapted to be disposed at the other side of the king pin.

3. The structure of claim 2 further characterized in that said yoke member includes a transversely extending bar mounted at the opposite end of said yoke member, said latch member and said bar providing attachment points for connection of said tie-down means to said coupling members, and said latch member and said bar being disposed at opposite sides of the stand and being of greater extent than said opening whereby to prevent complete detachment of said coupling from the stand.

4. In a system for securing a freight vehicle having a depending king pin to a transporting vehicle having a stand mountable in upright position with a platform portion at its upper end for supporting a portion of the freight vehicle adjacent the king pin, the improvement which comprises means on the stand defining a transverse opening therethrough below the platform, a coupling movably carried by the stand and extending through said opening, said coupling comprising a pair of relatively movable members adapted to be clamped around the king pin, first tie-down means connectible to the transporting vehicle and to one of said members for urging said one member in one direction, second tie-down means connectible to the transporting vehicle and having hook means connectible to the other of said members for urging said other member in the opposite direction toward said one member whereby to hold said members in clamped relation around the king pin and to restrain the freight vehicle against movement, and abutment means on said one member cooperable with said hook means when the latter is connected to said other member and said members are clamped on the king pin for preventing unintentional disengagement of said coupling from the king pin, said coupling being shiftable fore and aft to a limited extent relative to the stand whereby to protect the stand against imposition of dynamic loads from the freight vehicle.

5. The structure of claim 4 further characterized in that said one coupling member comprises an elongated yoke having a loop portion adapted to be disposed at one side of the king pin and said other coupling member comprises a transversely extending latch slidably connected to said yoke and adapted to be disposed at the opposite side of the king pin, said latch having wing portions extending transversely outwardly relative to said yoke and provided with apertures for receiving said hook means, and said abutment means comprises rigid members extending transversely outwardly from said yoke and located adjacent said apertures when said coupling members are disposed in clamped relation around the king pin whereby said hook means is engageable by said latch and said rigid members for blocking movement of said latch relative to said yoke.

6. The structure of claim 1 further characterized in that said stand comprises a pair of interconnected spaced members defining said transverse opening therebetween and said stand includes means defining an elongated pocket between said members below said opening, and a support is provided between said members for slidably supporting said coupling in operative horizontal position projecting transversely through said opening whereby said coupling is engageable with the king pin, said coupling when disengaged from the king pin being movable from said operative position to an inoperative nested position within said pocket.

7. The structure of claim 1 further characterized in that said stand comprises a pair of spaced channels each having web portions and side flange portions, said channels being arranged in laterally spaced side-by-side relation and rigidly interconnected, said stand being movable between said upright position and an inoperative prone position, and adjustable means is provided for maintaining said stand in a selected one of a plurality of fore and aft positions when the stand is in said upright position, said adjustable means comprising means secured to the transporting vehicle and defining rows of longitudinally spaced upstanding teeth adapted to receive the lower ends of said channel web portions therebetween, and a brace pivotally connected to said stand at one end and adapted to be detachably connected at its other end to the transporting vehicle, said stand being adapted to be knocked down from its upright position to its inoperative prone position when said other end of said brace is disconnected from the transporting vehicle, and said teeth being spaced sufficiently to allow said lower ends of said channel web portions to freely disengage from said teeth during knock down movement of the stand whereby to permit fore and aft adjustment of said stand when the latter is in said inoperative prone position.

8. The structure of claim 7 further characterized in that said adjustable means includes a pair of longitudinally extending transversely spaced channel members having webs secured to the transporting vehicle and having upwardly extending pairs of flanges which are notched at spaced intervals to provide said teeth, the lower ends of the respective channel web portions of said stand being recessed to receive the webs of said channel members whereby to permit the lower ends of said side flange portions of said stand to seat against the transporting vehicle.

References Cited in the file of this patent

UNITED STATES PATENTS

| | | |
|---|---|---|
| 2,036,344 | Menhall | Apr. 7, 1936 |
| 2,093,761 | Kramer | Sept. 21, 1937 |
| 2,099,288 | Allen | Nov. 16, 1937 |
| 2,118,364 | Sheehan | May 24, 1938 |
| 2,128,667 | Atherton | Aug. 30, 1938 |
| 2,159,479 | Goodwin et al. | May 23, 1939 |
| 2,196,537 | Sherman | Apr. 9, 1940 |
| 2,305,444 | Pond | Dec. 15, 1942 |
| 2,880,681 | Markestein et al. | Apr. 7, 1959 |
| 2,914,003 | Seel et al. | Nov. 24, 1959 |
| 2,916,238 | Fahland | Dec. 8, 1959 |
| 2,963,989 | Opsahl et al. | Dec. 13, 1960 |

FOREIGN PATENTS

| | | |
|---|---|---|
| 1,175,682 | France | Nov. 17, 1958 |